United States Patent Office.

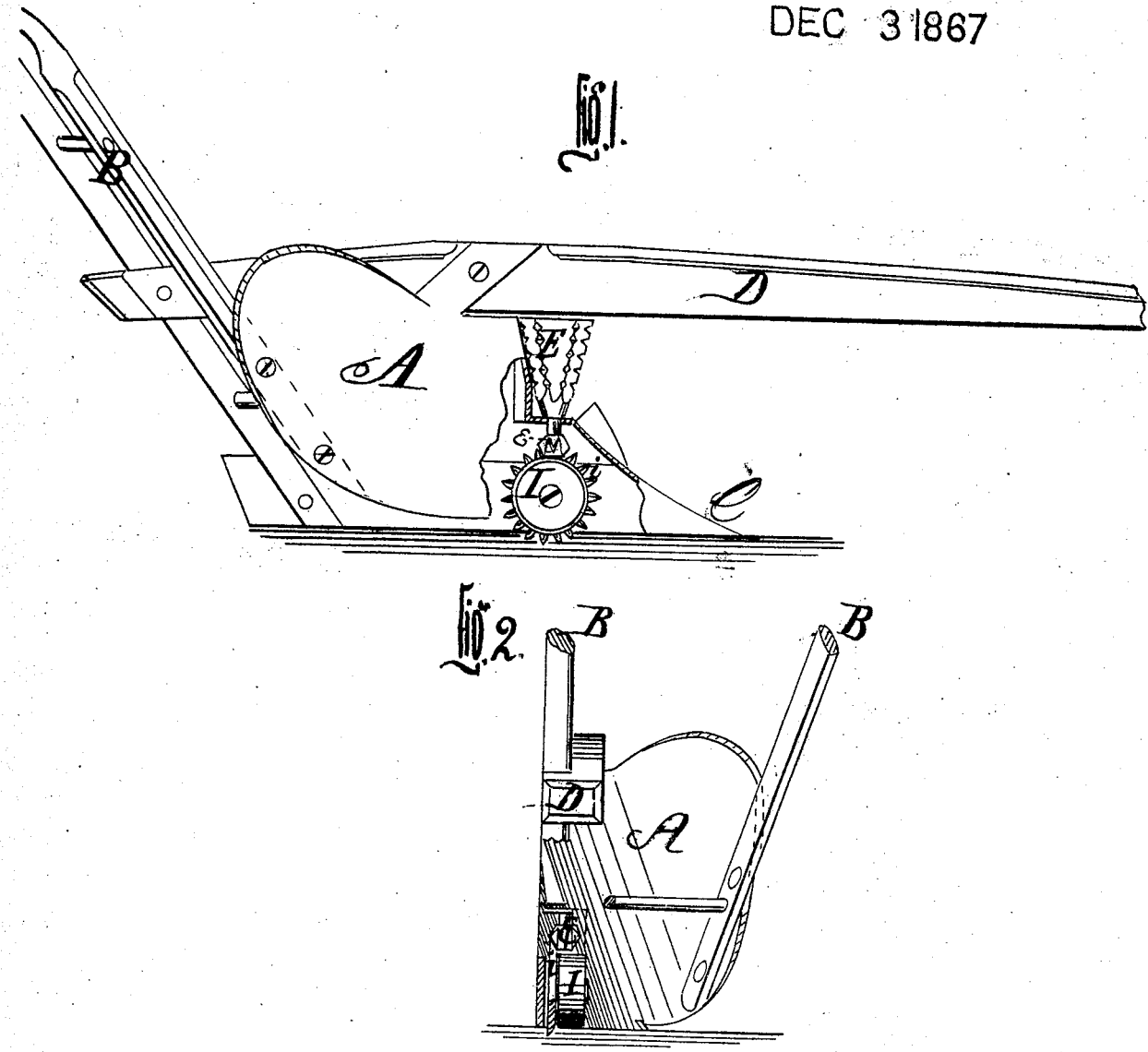

SAMUEL T. DENISE, OF RED BANK, NEW JERSEY.

Letters Patent No. 71,715, dated December 3, 1867.

IMPROVEMENT IN PLOUGHS.

The Schedule referred to in these Letters Patent and making part of the same.

TO ALL WHOM IT MAY CONCERN:

Be it known that I, S. T. DENISE, of Red Bank, in the county of Monmouth, and State of New Jersey, have invented a new and improved Plough; and I do hereby declare the following to be a full, clear, and exact description of the same, reference being had to the accompanying drawings, forming part of this specification, and in which—

Figure 1 is a side elevation of my invention, a portion of the mould-board being broken away to show the construction and connection of the parts.

Figure 2 is a rear elevation of the same.

In this invention an inverted conical roller, in front of the mould-board and above the plough-point, is rotated on its vertical axis by means of a small roller gearing with it under the plough.

Similar letters of reference indicate corresponding parts in the several figures.

In the drawings, A represents the mould-board, B the handles, C the point, and D the draw-beam of a common plough. In connection with this plough I use an inverted conical iron roller, E, bearing on journals which work in boxes attached to the beam D and the lower part of the body of the plough, in the manner shown in the drawings. The lower end of this roller is provided with a pinion, $e$, working behind the mould-board and within the body of the plough, and gearing with another pinion, $i$, actuated by a small ground-roller, I, situated in the recess behind the plough-point, in such a manner that the vertical roller shall be rotated by the small horizontal roller "with the sun" as the plough moves through the ground. The plough rests on the lower roller, and causes it to revolve with great power, sufficient at all times to impart the required motion to the vertical roller. The object of the latter is to assist in separating the glebe after the coulter has passed through it, and to diminish the friction against the forward edge of the mould-board. It has hitherto been used for this purpose independent of any apparatus for rotating it, relying for its rotation upon the movement of the plough through the sod. This, however, is not sufficient, and often causes it to act the wrong way, or, the sod pressing on both sides, does not cause it to act at all.

My object is to bring a power to bear upon the vertical roller, which will cause it always to rotate, and in the right direction; and this I perfectly accomplish in the manner shown. A plough thus constructed acts with great perfection, separating the turf and turning the sod smoothly and easily, to a degree never before attained by any device for a similar purpose. Any number of rollers on the mould-board or side of the plough may be rotated by a similar device.

Having thus described my invention, what I claim as new, and desire to secure by Letters Patent, is—

The combination, in a plough, of the vertical roller E with the horizontal roller I, the latter rotating the former, substantially in the manner and for the purposes specified.

SAMUEL T. DENISE.

Witnesses:
G. H. FULTON,
JAMES F. EARLE.
F. H. EARLE.